United States Patent
Nicholas

(10) Patent No.: US 7,366,811 B2
(45) Date of Patent: Apr. 29, 2008

(54) BUS ARBITRATION SYSTEM

(75) Inventor: Richard Nicholas, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 153 days.

(21) Appl. No.: 11/021,534

(22) Filed: Dec. 23, 2004

(65) Prior Publication Data

US 2006/0143349 A1    Jun. 29, 2006

(51) Int. Cl.
*G06F 13/362*    (2006.01)
(52) U.S. Cl. .................... 710/118; 710/113
(58) Field of Classification Search ........ 710/112–113, 710/116; 711/151
See application file for complete search history.

(56) References Cited

U.S. PATENT DOCUMENTS

| | | | |
|---|---|---|---|
| 5,956,493 A * | 9/1999 | Hewitt et al. ............... | 710/113 |
| 6,092,137 A | 7/2000 | Huang et al. | |
| 6,178,475 B1 * | 1/2001 | O'Brien ...................... | 710/116 |
| 6,718,422 B1 | 4/2004 | Kelley et al. | |
| 7,062,582 B1 * | 6/2006 | Chowdhuri ................. | 710/116 |
| 7,093,045 B2 * | 8/2006 | Yamamoto .................. | 710/116 |
| 7,107,376 B2 * | 9/2006 | Asano et al. ............... | 710/117 |
| 7,120,714 B2 * | 10/2006 | O'Connor et al. .......... | 710/243 |
| 2003/0221033 A1 | 11/2003 | Kim | |
| 2004/0225767 A1 | 11/2004 | Tasi | |
| 2004/0236889 A1 | 11/2004 | Kim | |

\* cited by examiner

*Primary Examiner*—Clifford Knoll
(74) *Attorney, Agent, or Firm*—Wood, Herron & Evans, LLP

(57) ABSTRACT

A circuit arrangement, program product and method for bus arbitration alters the sequence in which device requests are arbitrated with respect to each other and to a previous arbitration sequence. To this end, an arbiter grants access to a first group of devices according to a predetermined sequence. The arbiter then automatically alters the sequence for a second group of devices, granting access to the bus for the second group according to the altered sequence. These features allow the order in which the arbiter sequences through the groups to be automatically varied with respect to each other, diminishing the likelihood of lockout.

9 Claims, 2 Drawing Sheets

BUS ARBITRATION SYSTEM

FIELD OF THE INVENTION

The present invention relates generally to a method and system for data processing, and more particularly, to a method and system for bus arbitration.

BACKGROUND OF THE INVENTION

Computer systems rely on the cooperative interaction of numerous, specialized devices configured to perform a variety of tasks. Typically, the devices interact by reading or writing data to other components in the system. The successful exchange of data between these components is consequently vital to the operation of computer systems. Such devices commonly include a processor, memory and certain peripheral devices, such as mass storage devices, network adapters, display adapters, audio adapters and workstation controllers. These devices are typically coupled together using a network of address, data and control lines, commonly referred to as a bus.

One common type of bus is known as the Peripheral Component Interconnect (PCI) bus. Under the PCI bus standard, peripheral components can connect to a PCI bus without the need for glue logic. Thus, PCI provides a bus standard on which high performance peripheral devices, such as graphics devices, control panels, tape drives, as well as optical and hard disk drives, can be coupled to a processor. Bus standards more particularly refer to an independent set of protocols, or rules, to conduct data transfers between the various devices attached to it. Each of these protocols is designed into a bus directly and is commonly referred to as the architecture of the bus.

In a data transfer between different bus architectures, data being transferred from the first bus architecture may not be in a form that is usable or intelligible by the receiving second bus architecture. Accordingly, mechanisms have developed for translating data that is required to be transferred from one bus architecture to another. This translation mechanism is normally contained in a hardware device in the form of a bus-to-bus bridge, or interface, through which the two different types of buses are connected.

Various bus-to-bus bridges have consequently been designed to match the communication protocol of one bus with that of another. These bridges thus permit system wide communications between devices on different buses. For example, a bus-to-bus bridge connecting between a system bus and a PCI local bus is called a PCI host bridge. The PCI host bridge contains all the logic and hardware for translating data communications between the system bus and the PCI local bus, and ensures that data is transferred between these two buses intelligibly.

A variant of PCI, PCIX, includes a host bridge through which the respective devices may gain access to the bus. The host bridge performs write back splits, or communicates with the system bus on behalf of requesting devices. For instance, an Ethernet device may send a data request to a host bridge, which in turn, sends a request for the data to a bus coupled to a memory device storing the data. The bridge then receives the data from the memory device and sends it back to the Ethernet device. Each bridge usually has posting buffers for temporary buffering of bus transactions, as these transactions flow through the bridge in both directions.

Multiple devices connected to the different buses must not be allowed access via the host bridge to the processor or a local bus at the same time. Such simultaneous access would confuse computer systems, producing unuseable results. Such confusion is avoided by using a bus arbiter. A bus arbiter controls device access to the bus. Processes used to decide when a device may next access the bus via the host bridge is appropriately called bus arbitration. In a bus arbitration scheme, a device (that may include the host bridge) wanting to use the bus signals a bus request. In response, the arbiter sends a grant signal to the device. After the grant is received, the device may send a request to the host bridge, prompting the host bridge to access the bus on the other side of the bridge on behalf of the device, i.e., to read or write data according to the request. The arbiter can then grant to another device the privilege of having cycles run by the host bridge on its behalf.

Arbitration schemes are usually designed to balance two factors when determining a sequence for granting the bus via the host bridge. First, each device request typically has a bus priority, and the highest priority devices are serviced first. Second, to help avoid instances where low priority devices are locked out, most I/O buses such as PCI also require the arbiter to implement some kind of fairness protocol. The intent of a fairness protocol is to assure that all devices receive a turn on the bus. For instance, one conventional fairness protocol is a round robin scheme. Under a round robin fairness protocol, a device that has just completed a bus operation is not granted access to the bus for a second operation until all other requesting devices have first been granted access to the bus.

Even though a bus may provide a fairness protocol in the arbiter(s) that control access to the bus, acceptable access to the bus can be effectively denied, or locked, to devices. If several or all of the devices are competing for a single resource, such as system memory, and one of the devices is monopolizing the memory, then another device needing access to the memory may be unable to access the monopolized resource. This lockout may occur even though the arbiter fairly grants bus access to all requesting devices. The locked out device is thus unable to capitalize on its bus access allowed by the arbiter, and consequently receives a retry signal, relegating the device to attempting the transaction at some later time.

More particularly, many buses provide a performance feature usually referred to as retry capability that allows a device to disconnect from the bus/host bridge if it is not able to handle the request at that time. If a target device is not able to handle a request when it occurs, that target can issue a retry, which indicates to the device that issued the request on the bus to try again later.

Lockout generally involves interaction between the set of buffers in a bridge, the arbiter, and the bus traffic by devices on the bus. For example, an arbiter may have a round-robin fairness protocol for five devices (Device A, Device B, Device C, Device D and a host bridge). The host bridge is assigned the highest priority (priority 0), Device A is assigned the next highest priority (priority 1), Device B is assigned the next highest priority (priority 2), Device C is assigned the next highest priority (priority 3), and Device D is assigned the next highest priority (priority 4). If all devices ask for the bus at the same time, the fairness protocol will assure that each device gets a chance to try to utilize the bus. The arbitration priority, in this example, simply determines the order in which the devices get a turn to try to utilize the bus.

When all devices request use of the bus, the host bridge is granted first access, then Devices A to D in sequence. In one scenario under this scheme, Device A may be running a large amount of reads to system memory on the other side of the host bridge. Device A will consequently re-request the bus for a new transaction as soon as it completes the current transaction. As such, the host bridge contains four read buffers that are all currently allocated to Device A reads. Device B may subsequently want to do some reads. When Device B gets the bus, however, Device B gets a retry because the bridge's buffers are full with Device A reads. That is, while the host bridge is acquiring the read data for its four buffers, all other devices that run reads to the host bridge will receive retries. Eventually, the bridge empties out one of its buffers onto the bus, completing one of the read transactions to Device A. The host bridge now has one of its four buffers free, but because in the current scheme Device A will always get the bus after the host bridge gets the bus because Device A is always requesting the bus. Device A will consequently get the bus next and queue another read to the host bridge, using the one free buffer slot. Next, the arbiter will grant the bus to Device B, but again, there will be no buffers free to usem and Device B will receive a retry.

Because the host bridge must get a turn on the bus in order to free up a buffer, and because Device A always gets to run right after the host bridge, it is clear that Device A will continue to be able to claim every buffer that frees up, locking out Device B for as long as Device A wants to do reads. A lockout can occur such that each time a specific device gets a turn on the bus and is turned away with a retry (or equivalent, depending on the bus type) because other devices keep filling up the bridge buffers, i.e., saturating the host bridge. A large number of retries could result in significant performance losses or even errors for the device that is being locked out. For example, the device being locked out may be an ethernet controller that has a requirement to deliver the next packet within a certain period of time, or else the packet will time out and be considered lost. The ethernet controller cannot deliver the packet in time because it is being locked out from reading the packet's data from system memory.

The arbiter does not know or care that there are two devices competing for a common resource. The arbiter does not know the destination of the various transactions and how they interrelate. The arbiter is unaware of which devices are retried. As far as the arbiter is concerned, the transaction was successful in that the device was granted access to run on the bus, even though the device was unable to receive the requested data. The arbiter has fulfilled its programmed fairness requirement.

Therefore, what is needed is an improved system for arbitrating device access to a desired bus.

SUMMARY OF THE INVENTION

The present invention provides a circuit arrangement, method and program product configured to improve bus arbitration by, in one aspect, automatically altering the sequence in which device requests are arbitrated with respect to each other and to a previous arbitration sequence. To this end, features of the present invention include an arbiter configured to grant access to a first group of devices according to a predetermined sequence. The arbiter may automatically alter the sequence for a second group of devices, then grant access to the bus for the second group according to the altered sequence. These features allow the order in which the arbiter sequences through the groups to be automatically varied with respect to each other, diminishing the likelihood of lockout.

Moreover, the variance, or altering of the sequences, may occur after differing periods of time, further minimizing conventional arbitration problems. To achieve this benefit, aspects of the invention may include an indicator, such as a pointer used to determine when the altering of the sequence should occur. The indicator may be adjusted from time to time in response to an arbitration and/or the expiration of a period of time. As such, the arbiter may increment and otherwise maintain a counter to keep track of when the indicator should be adjusted. The arbiter will typically grant access to each request in a group according to the appropriate sequence before moving on to a next group.

Another aspect of the invention may include a host bridge configured to access the bus on behalf of another requesting device. Features of the invention thus may apply particularly well in the context of multiple devices attempting to share a common resource, where the shared resource includes a device for retrieving data on behalf the multiple devices.

The above and other objects and advantages of the present invention shall be made apparent from the accompanying drawings and the description thereof.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION

Figure 1:
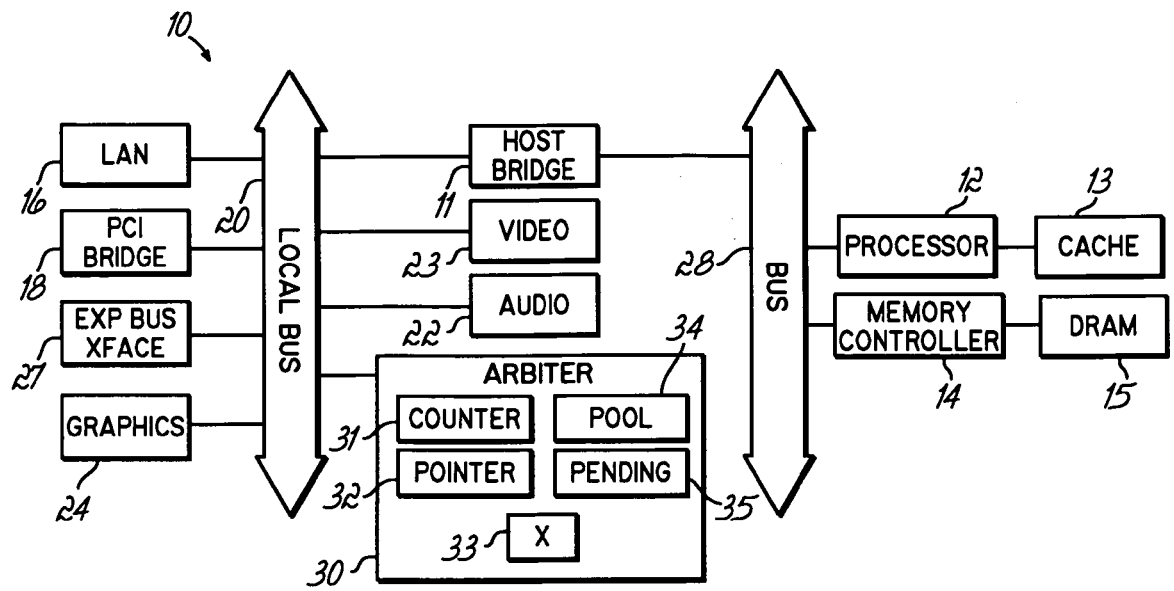
FIG. 1 is a block diagram of a computer system having a local bus architecture that is configured to automatically alter the sequence in which device requests are arbitrated with respect to each other and to a previous arbitration sequence.

Features of the present invention include a circuit arrangement, program product and method for arbitrating device access to a bus. Aspects of the invention allow the order in which an arbiter sequences through one or more pools to be automatically varied. Moreover, the variance may occur after differing periods of time, further diminishing the likelihood of lockout. Further aspects of the invention include an arbiter that starts an arbitration period, or tenure, on a clock pulse boundary where one or more requests are pending. Requests are captured in a pool of current requests during the tenure. These requests are serviced one at a time until the pool of current requests is empty. At this point, the arbitration tenure is over, and if any new requests are pending, they are captured into a second pool of current requests, and a new arbitration tenure begins.

During an arbitration tenure, any requests that arrive after the tenure began are latched, or stored as pending, but are not allowed into the pool of current requests until the next arbitration tenure begins. For instance, if four request inputs are received on a first clock pulse, all four request inputs are put into a current pool. On a second clock pulse, three more requests may be received. These three new requests may be latched as pending, but do not enter the pool. The arbiter may give a grant to each of the four requesting devices in the current pool, and consequently removes each request from the pool of current requests. When the last request is removed from the pool of current requests, i.e., the pool is empty, a new arbitration tenure begins, bringing the previously latched three requests into a new pool of current requests. These three requests are then serviced one by one in the current arbitration tenure while subsequent requests become pending and queued up for the next arbitration tenure.

An aspect of the invention mitigates lockout by varying the order that requests are serviced in the pool of current requests. For instance, the arbiter may switch the order in which requests are addressed, e.g., from ascending order to descending order in different arbitration tenures. For example, when a pointer is in the up direction, pending requests may be serviced in ascending order. When the pointer is alternatively in a down direction, pending requests are serviced in descending order. The direction of the pointer may be changed periodically or non-periodically, and in alternating intervals. For instance, the direction of the pointer may change every fourth arbitration tenure for a period, then change to every second arbitration tenure for another period, after which the period may change again. The variance provided by this feature further mitigates instances of lockout. One skilled in the art will appreciate that multiple other algorithms may be employed to change the direction of the pointer. Such a pointer change will further not affect the performance or fairness of the arbiter because neither factor is affected by the order in which requests are serviced once they are inside the pool of current requests. Namely, by varying the pointer as discussed herein, instead of by a fixed amount, there is no chance of the pointer always being in the same direction for a device.

Referring now to the drawings and in particular to FIG. 1, there is depicted a block diagram of an exemplary computer system 10 having a local bus consistent with the principles of the present invention. As shown, a processor 12, a cache memory 13, a memory controller 14, a Dynamic Random Access Memory (DRAM) 15 and the arbiter 30 are connected to a system bus 28 of the computer system 10. Processor 12, cache memory 13, memory controller 14 and DRAM 15 are also coupled to a PCI local bus 20 of computer system 10 through a host bridge 11. Host bridge 11 provides a low latency path through which processor 12 may access devices mapped anywhere within bus memory and/or I/O address spaces. Host bridge 11 also provides a high bandwidth path for allowing devices to access DRAM 15. Host bridge 11 may include various functions such as data buffering and posting.

Also attaching to local bus 20 may be other devices such as a local-area network (LAN) interface 16 and an expansion bus interface 27. LAN interface 16 is for connecting computer system 10 to a LAN, such as Ethernet or Token-Ring. The configuration may also support separate local buses under separate host bridges. For example, PCI-to-PCI bridge 18 allows local bus 20 to connect to another local bus (not shown), which in turn, may connect to a variety of other devices (also not shown).

Expansion bus interface 27 may couple any other non-PCI peripheral buses, such as ISA bus, EISA bus, and/or Micro-Channel Architecture (MC-A) bus to local bus 20. Typically, various non-PCI peripheral devices for performing certain basic I/O functions are attached to one of the peripheral buses. As shown in FIG. 1, local bus 20 may connect via add-in board connectors to various devices that include an audio adapter board 22, a motion video adapter board 23 and a graphics adapter board 24.

Bus bridges, such as host bridge 11 and PCI-to-PCI bridge 18, are typically coupled between a primary bus and a secondary bus. A bus bridge enables an access request that initiates on the primary bus to have a destination on the secondary bus, and enables an access request that initiates on the secondary bus to have a destination on the primary bus. For example, after receiving an access request from system bus 28, host bridge 11 will initiate an access request on local bus 20 to communicate with one or more of devices 16, 18, 22, 23, 24, or 27.

Device access to each other may be managed by the arbiter 30. In one respect, the arbiter 30 mitigates the chances of lockout by automatically varying the sequence in which device requests in a pool 34 are serviced. To this end, the arbiter 30 may include a pointer 32 that indicates the order in which the requests are to be addressed. A counter 31 and a preset variable, "x," may further be used to vary the sequence of arbitration by automatically switching the direction of the pointer 32 after a period of time or number of cycles. Where desired, even that period may be varied to further promote successful access, e.g., successful read and write operations in the absence of prolonged lockouts. After each request in the current pool 34 has been granted access to local bus 20, the arbiter 30 may create a new pool comprised of pending requests 35 received and stored while the first tenure was completed.

One skilled in the art will appreciate that other devices included in system 10 may comprise any of a number of different peripheral devices including video accelerators, audio cards, hard or floppy disk drives, Small Computer Systems Interface (SCSI) adaptors and the like. Moreover, the devices shown in FIG. 1 comprise both initiator and target functions, however, one skilled in the art will appreciate that distinct target and initiator devices may be substituted for the single devices shown in FIG. 1. Furthermore, while each component in FIG. 1 is shown as being a separate device, one skilled in the art will appreciate that many such components may be included on one or more microchips per application specifications.

System 10, or any subset of components therein, may also be referred to hereinafter as an "apparatus". It should be recognized that the term "apparatus" may be considered to incorporate various data processing systems such as computers and other electronic devices, as well as various components within such systems, including individual integrated circuit devices or combinations thereof. Moreover, within an apparatus may be incorporated one or more logic circuits that circuit arrangements, typically implemented on one or more integrated circuit devices, and optionally including additional discrete components interfaced therewith.

It should also be recognized that circuit arrangements are typically designed and fabricated at least in part using one or more computer data files, referred to herein as hardware definition programs, that define the layout of the circuit arrangements on integrated circuit devices. The programs are typically generated in a known manner by a design tool and are subsequently used during manufacturing to create the layout masks that define the circuit arrangements applied to a semiconductor wafer. Typically, the programs are provided in a predefined format using a hardware definition language (HDL). Thus, while the invention has and hereinafter will be described in the context of circuit arrangements implemented in fully functioning integrated circuit devices, those skilled in the art will appreciate that circuit arrangements consistent with the invention are capable of being distributed as program products in a variety of forms, and that the invention applies equally regardless of the particular type of computer readable signal bearing media used to actually carry out the distribution. Examples of computer readable signal bearing media include but are not limited to recordable type media such as volatile and non-volatile memory devices, floppy disks, hard disk drives, CD-ROM's, and DVD's, among others, and transmission type media such as digital and analog communications links.

Those skilled in the art will thus recognize that the exemplary environment illustrated in FIG. 1 is not intended to limit the present invention. Indeed, those skilled in the art will recognize that other alternative hardware and/or software environments may be used without departing from the scope of the invention.

Figure 2:
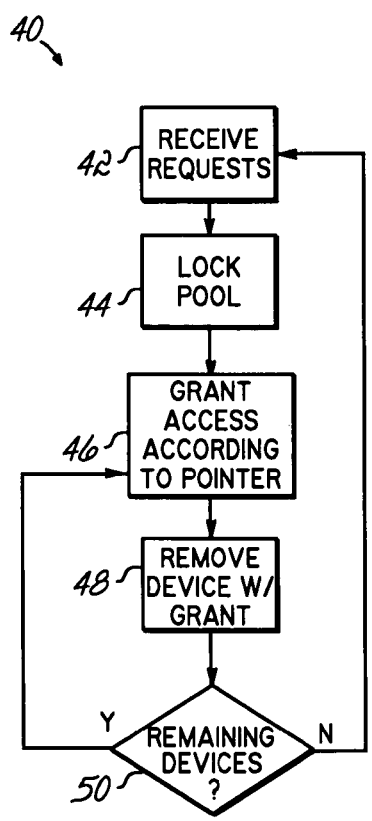
FIG. 2 is a flowchart having steps executable by the arbiter of the system of FIG. 1 for managing device access to the bus.

FIG. 2 is a flowchart 40 having steps executable by the arbiter 30 of the system 10 of FIG. 1 for managing device access to a bus 28. Features of the flowchart 40 allow the arbiter 30 to automatically vary the order in which requests are sequenced to diminish the likelihood of lockout. More particularly, the arbiter 30 receives at block 42 requests from devices 11, 16, 18, 22, 23, 24, and/or 27 to access to the bus 28. For instance, an Ethernet device may require and request data stored in a DRAM 115. The arbiter 30 may limit, or lock, at block 44 of FIG. 2 the pool 34 of requests to those current request(s) received at block 42. The current pool comprises an arbiter tenure. Requests received while current requests remain in the pool 34 will be latched, or temporarily stored. While the timing of the steps of the flowchart 40 may vary as between different applications, the requests of block 42 may be received within a single clock pulse or on different clock pulses.

At block 46 of FIG. 2, the arbiter 30 grants access to the bus for each request according to the sequence dictated by the pointer order. For instance, a request corresponding to a first device 16 will be received by the host bridge 11. The host bridge 11 may access the bus 28 and perform a read or write function on behalf of the requesting device 16. The host bridge 11 may subsequently return data from the target memory 15 to the requesting device 16. The request corresponding to the device 16 will then be removed from the pool 34 at block 48. If any requests remain in the pool at block 50, then the arbiter 30 may grant access to the bus 28 for the next device having a request in the pool 34 according to the scheme dictated by the pointer 32. For instance, the pointer 32 may dictate that the arbiter 30 proceed in descending order from the request of first device 16 in the pool list. One skilled in the art will appreciate that the requesting device may comprise the host bridge 11, itself.

Figure 3:
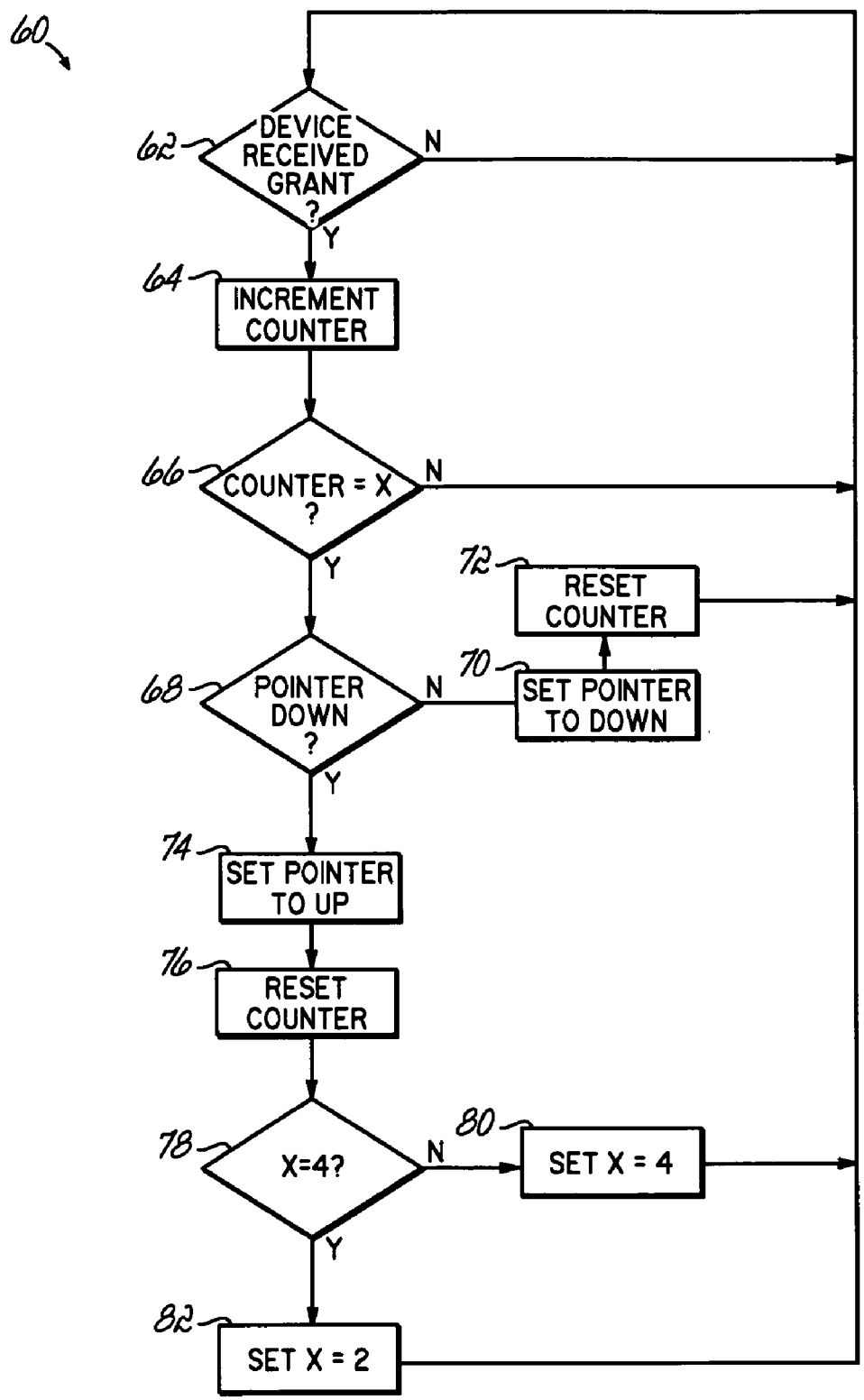
FIG. 3 is a flowchart having a sequence of steps executable by the arbiter of the system of FIG. 1 for determining the sequence used to grant access to the bus for a plurality of requesting devices.

FIG. 3 is a flowchart 60 having a sequence of steps executable by the arbiter 30 of FIG. 1 for determining the sequence used to grant access to a bus for a plurality of requesting devices. The steps of the flowchart 60 may presume for exemplary purposes that the pointer 32 is initially preset as "up," the counter 31 is "0," and a variable "x" 33 is set to 4. One skilled in the art will appreciate, however, that other settings may alternatively be used per application specifications. Features of the flowchart 60 allow the order in which the arbiter 30 sequences through one or more pools 34 to be automatically varied. Moreover, the variance may occur after differing periods of time, further diminishing the likelihood of lockout.

Turning more particularly to block 62 of FIG. 3, the arbiter 30 may determine if a device 18 has been granted access to the bus 28. If so, then the arbiter 30 may increment at block 64 the counter 31. As such, the counter 31 may have a value of "1."

The arbiter 30 may determine at block 66 if the value of the counter 31 equals the value of x, i.e., "4." If not, then the arbiter 30 may continue to grant bus access and increment the counter 31 at block 64 until the counter 31 increments to a value equal to "x" at block 66. This feature allows the arbiter 30 to continue to sequence through requests in one or more tenures for x times.

Where this counter condition is finally satisfied at block 66, the arbiter 30 may determine at block 68 the direction of the pointer 32. For instance, the arbiter 30 may determine at block 68 if the pointer 32 is down. If not at block 68, then the arbiter 30 may flip the orientation of the pointer 32, i.e, down, at block 70. This change of the pointer's direction will cause the arbiter 30 to sequence through the pool 34 in the opposite direction. By varying the order in which the requests are granted access to the bus via the host bridge 11, the chances of a lockout are diminished. The arbiter 30 may furthermore reset the counter 31 to "0" at block 72. As such, the pointer 32 and associated pointer/sequence direction will be altered on a subsequent cycle beginning back at block 62.

Should the arbiter 30 alternatively determine at block 68 of FIG. 3 that the pointer 32 is down, then the arbiter may set the pointer 32 to be up at block 74. This change of the pointer's direction will cause the arbiter 30 to subsequently sequence through the pool 34 in the opposite direction. The arbiter 30 may additionally reset the counter 31 to 0 at block 76.

The arbiter 30 may determine at block 78 if the value of x33 is 4. If not, then the arbiter 30 may change the value of x to 4 at block 80. If the stored value of x33 is alternatively equal to 4 at block 78, then the arbiter 30 may set the value of x33 to a new value of 2 at block 82. This variation may further mitigate the occurrences of lockout. One skilled in the art will appreciate that the exemplary values of x may vary dramatically in different embodiments consistent with the invention.

In use, a first device has saturated a resource inside the host bridge, but a second device wants to run a cycle using the bus. The host bridge is ready to complete a transaction for the first device so that it can attend to the others in the pool of requests. For purposes of the example, the pointer is initially in the up direction. If the host bridge runs its transaction, then the first requesting device runs and queues another transaction, and the second device would be retried because the resource was being used. This lockout, as described earlier, will continue to happen as long as the pointer remains in the up direction. But under the scheme afforded by the present invention, the pointer changes direction and will soon be in the down direction. If the pointer is in the down direction after the host bridge runs a transaction, freeing up one of its buffers, then it is the second device, not the first device, which will be granted the bus next and will be able to queue its transaction to the free buffer in the host bridge. As such, no lockout occurs. According to an embodiment consistent with the invention, the duration of the pointer values are varied in addition to the direction of the pointer in order to eliminate the possibility that even though the pointer direction is changing, there could still be some repeatable pattern that the system could fall into whereby the pointer is always in the same direction at just the wrong instant to cause a lockout. Varying the pointer duration slides the window of the pointer value with respect to the fixed transactions, avoiding any repeatable relationship between the two.

While the present invention has been illustrated by a description of various embodiments and while these embodiments have been described in considerable detail, it is not the intention of the applicants to restrict, or in any way limit, the scope of the appended claims to such detail. For instance, while embodiments where discussed in the context of PCI and PCIX, aspects of the invention may have equal application in the context of Rapid I/O, and PCI Express, among others. As such, additional advantages and modifications will readily appear to those skilled in the art.

The invention in its broader aspects is therefore not limited to the specific details, representative apparatus and method, and illustrative example shown and described. Furthermore, it will be appreciated that various additional modifications may be made to the illustrated embodiments consistent with the invention. It will also be appreciated that implementation of the functionality described above, and in particular, of the specific sequences of operations illustrated in FIGS. 2 and 3, within logic circuitry disposed on a memory device, a memory controller, and/or other control logic in a memory architecture, would be well within the abilities of one of ordinary skill in the art having the benefit of the instant disclosure. Accordingly, departures may be made from such details without departing from the spirit or scope of applicant's general inventive concept.

What is claimed is:

1. A method for bus arbitration in a computer system, the method comprising:

granting access to a bus for a first plurality of devices according to a predetermined arbitration scheme for determining in which order the devices of the first plurality receive access to the bus relative to one another, wherein granting access to the bus for the first plurality of devices includes grouping requests associated with the first plurality of devices to create a first pool and sequencing through each request of the first pool according to the predetermined arbitration scheme until access to the bus has been granted for each request of the first pool;

automatically altering the predetermined arbitration scheme; and granting access to the bus for a second plurality of devices according to the altered arbitration scheme, wherein granting access to the bus for the second plurality of devices includes grouping requests associated with the second plurality of devices and received subsequent to the requests of the first pool to create a second pool and sequencing through each request of the second pool according to the altered arbitration scheme until access to the bus has been granted for each request of the second pool.

2. The method of claim 1, wherein automatically altering the predetermined arbitration scheme further comprises maintaining an indicator used to determine the altering of the predetermined arbitration scheme.

3. The method of claim 2, further comprising automatically adjusting the indicator.

4. The method of claim 3, wherein adjusting the indicator further includes adjusting the indicator in response to an arbitration performed by the system.

5. The method of claim 3, wherein adjusting the indicator further includes incrementing a counter in response to at least one of an arbitration, a number of grants, and an expiration of a time period.

6. The method of claim 5 further comprising comparing a predetermined value to the counter to determine if the indicator should be adjusted.

7. The method of claim 5 further comprising resetting the counter in response to adjusting the indicator.

8. The method of claim 1 wherein granting access to the bus further comprises granting access to a shared resource via the bus.

9. The method of claim 1, wherein granting the access to the bus further includes granting the access according to at least one of a round robin and fairness related scheme.

* * * * *